United States Patent
Lee (10) Patent No.: US 9,184,621 B2
(45) Date of Patent: Nov. 10, 2015

(54) APPARATUS AND METHOD FOR COMPENSATING POWER OF POWER SUPPLY DEVICE IN VEHICLE USING HIGH-CAPACITANCE CAPACITOR

(76) Inventor: Dae-Kyo Lee, Incheon (KR)

( * ) Notice: Subject to any disclaimer, the term of this patent is extended or adjusted under 35 U.S.C. 154(b) by 631 days.

(21) Appl. No.: 13/637,746

(22) PCT Filed: Dec. 8, 2010

(86) PCT No.: PCT/KR2010/008755
§ 371 (c)(1),
(2), (4) Date: Sep. 27, 2012

(87) PCT Pub. No.: WO2011/122756
PCT Pub. Date: Oct. 6, 2011

(65) Prior Publication Data
US 2013/0015701 A1    Jan. 17, 2013

(30) Foreign Application Priority Data
Apr. 1, 2010  (KR) .................. 10-2010-0030095

(51) Int. Cl.
*B60L 3/00* (2006.01)
*H02J 7/14* (2006.01)
*H02J 7/34* (2006.01)

(52) U.S. Cl.
CPC ............. *H02J 7/1446* (2013.01); *H02J 7/345* (2013.01); *Y02T 10/7005* (2013.01); *Y02T 10/7022* (2013.01); *Y02T 10/92* (2013.01)

(58) Field of Classification Search
USPC ........................................ 307/9.1, 109, 130
See application file for complete search history.

(56) References Cited

FOREIGN PATENT DOCUMENTS

JP          2008193795 A  *  8/2008

* cited by examiner

*Primary Examiner* — Rexford Barnie
*Assistant Examiner* — Xuan Ly
(74) *Attorney, Agent, or Firm* — Bacon & Thomas, PLLC (57) ABSTRACT

An apparatus and method for compensating power of electrical load in a vehicle using a high-capacitance capacitor is provided. The high-capacitance capacitor rapidly discharges current to compensate power when voltage output from a generator and battery has temporarily dropped while the vehicle is traveling and the capacitor is charged in a constant power pulse charging manner to prevent battery voltage instability due to generator overload caused when the capacitor is charged. The capacitor is temporarily stopped from being charged and discharges current to compensate power of electrical load if terminal voltage of the battery is reduced due to the electrical load when the capacitor is charged, resulting in compensation of power supply instability such as voltage decrease in real time to improve vehicle output and to prevent temporary deceleration, thereby not only improving driving characteristics but also significantly increasing fuel efficiency and performance and lifespan of various electric parts.

14 Claims, 5 Drawing Sheets

APPARATUS AND METHOD FOR COMPENSATING POWER OF POWER SUPPLY DEVICE IN VEHICLE USING HIGH-CAPACITANCE CAPACITOR

BACKGROUND OF THE INVENTION

1. Field of the Invention

The present invention relates to an apparatus and method for compensating power of a power supply device in a vehicle using a high-capacitance capacitor.

2. Description of the Related Art

Although recent cars exhibit excellent performance, especially, near perfect combustion, due to development of various parts and Electronic Control Unit (ECU) software control technology, technical development is still needed to increase power transmission efficiency and to improve factors that affect the stability of ECU operation.

Future efforts should more focus on developing technical methods and mechanisms which can improve fuel efficiency (i.e., mileage) and performance of a vehicle by appropriately using engine force depending on travel situations when the vehicle travels.

For example, mileage is expected to be improved by 15% or more through eco-driving, i.e., by correcting inefficient drive behaviors such as sudden acceleration, sudden starts, sudden braking, and high-speed driving. However, such a mileage improvement method is not efficient since the effects of fuel economy-maximizing behaviors greatly vary among drivers and the effectiveness thereof is not always high.

That is, mileage improvement through change in driving behavior may not be effective since it is not practical to request such driving behaviors from drivers, regardless of traffic situations as in downtowns.

Technology in which a super capacitor is connected to a battery in a vehicle and voltage of the battery is stabilized using charged voltage of the capacitor has been introduced to solve such problems.

Electric Double Layer Capacitors (EDLC), which are high-capacitance capacitors, are advantageous over general batteries in that they exhibit performance of more than 100 times in supplying instantaneous peak power for a very small time although they can store smaller energy than batteries.

If such advantages are applied to the battery, it is possible to efficiently cope with instantaneous voltage decrease of the battery which occurs within several seconds, thereby supplying high-quality power to a sensitive load. This not only achieves power stability but also assists the battery, extending the lifespan of the battery.

However, since the high-capacitance capacitor has a high capacitance of several to thousands of farads (F), current in a range of tens to thousands of amperes (A) flow when the high-capacitance capacitor is charged, causing instantaneous voltage decrease. In addition, the high-capacitance capacitor also affects charged voltage of the battery due to overload of the generator, failing to improve mileage, although output and noise reduction are improved.

Since a power stabilization apparatus which simply uses the conventional high-capacitance capacitor causes battery or generator overload, exerting a negative influence on mileage, power stabilization apparatuses mostly employ a small-capacitance capacitor rather than a high-capacitance capacitor. However, it was found that the small-capacitance capacitor provides almost no improvement in mileage or performance when battery voltage instantaneously drops since fuel rate is determined after the ECU of the vehicle performs learning.

SUMMARY OF THE INVENTION

Therefore, the present invention has been made in view of the above problems, and it is an object of the present invention to provide an apparatus and method for compensating power of a power supply device in a vehicle using a high-capacitance capacitor wherein a high-capacitance capacitor rapidly discharges current to compensate power when voltage output from a generator and a battery in the vehicle has temporarily dropped while the vehicle is traveling and the high-capacitance capacitor is charged in a constant power pulse charging manner to prevent voltage instability of the battery due to overload of the generator caused when the high-capacitance capacitor is charged and, in addition, the high-capacitance capacitor is temporarily stopped from being charged and discharges current to compensate power of an electrical load in the vehicle in the case in which terminal voltage of the battery has been reduced due to the electrical load of the vehicle when the high-capacitance capacitor is charged, thereby achieving advantages in that power supply instability such as voltage decrease is compensated for in real time to improve output of the vehicle and to prevent temporary deceleration, thereby not only improving driving characteristics of the vehicle but also significantly increasing fuel efficiency and performance and lifespan of various electric parts.

In accordance with the present invention, the above and other objects can be accomplished by the provision of an apparatus for compensating power of a power supply device in a vehicle using a high-capacitance capacitor, the power supply device including a generator for the vehicle, a battery connected in parallel to the generator, and an electric load that receives power from the generator and the battery, the apparatus including a 1st EDLC module connected in parallel to the battery to perform charge and discharge operations and to compensate low-capacitance power, a 2nd EDLC module connected in parallel to the battery to perform charge and discharge operations and to compensate high-capacitance power, a controller that receives operating power from the generator and the battery and controls overall operation of the apparatus, a battery voltage detector that detects voltage of the battery, a charge and discharge connection switching unit provided between the 2nd EDLC module and ground to control charge and discharge operations of the 2nd EDLC module, a constant power charge switching unit that is controlled to allow the 2nd EDLC module to be charged with constant power when the 2nd EDLC module performs a charge operation, an EDLC module voltage detector that detects a charged voltage of the 2nd EDLC module, and a discharge detector that detects a discharge operation of the 2nd EDLC module, wherein, when a terminal voltage of the battery has increased from a previous terminal voltage thereof by a first predetermined level or more or when the terminal voltage of the battery has rapidly decreased from the previous terminal voltage by a second predetermined level or more while the voltage of the battery detected through the battery voltage detector is a normal reference voltage at which it is possible to charge the 2nd EDLC module, the controller performs a charge standby mode in which the controller outputs a low signal to the charge and discharge connection switching unit and the constant power charge switching unit to disconnect the battery and the 2nd EDLC module from each other to temporarily prevent charge and discharge operations and, in addition, when the terminal voltage of the battery is a normal reference voltage at which it is possible to perform charging and the terminal voltage of the battery is in a normal state in which the terminal voltage of the battery has not increased from the previous terminal voltage by the first predetermined level or more or the terminal voltage of the battery has not rapidly decreased from the previous terminal voltage by the second predetermined level or more, the controller performs a charge and discharge mode in which the controller compares the terminal voltage of the battery and a charged voltage of the 2nd EDLC module detected through the EDLC module voltage detector, and outputs, upon determining that a voltage difference between the terminal voltage of the battery and the detected charged voltage of the 2nd EDLC module is zero, a high signal to the charge and discharge connection switching unit and the constant power charge switching unit to connect the battery and the 2nd EDLC module to each other to enable normal charge and discharge operations and, in addition, when the terminal voltage of the battery is a normal reference voltage at which it is possible to perform charging and the terminal voltage of the battery is in a normal state in which the terminal voltage of the battery has not increased from the previous terminal voltage by the first predetermined level or more, the terminal voltage of the battery has not rapidly decreased from the previous terminal voltage by the second predetermined level or more, or the apparatus is in the charge standby mode, the controller performs a constant power charge mode in which the controller compares the terminal voltage of the battery and a charged voltage of the 2nd EDLC module detected through the EDLC module voltage detector, and outputs, upon determining that a voltage difference between the terminal voltage of the battery and the detected charged voltage of the 2nd EDLC module is a third predetermined level or more, a low signal to the charge and discharge connection switching unit to disconnect the battery and the 2nd EDLC module from each other and outputs a constant power pulse signal to the constant power charge switching unit in order to charge the 2nd EDLC module with constant power which is proportional to the detected voltage difference.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
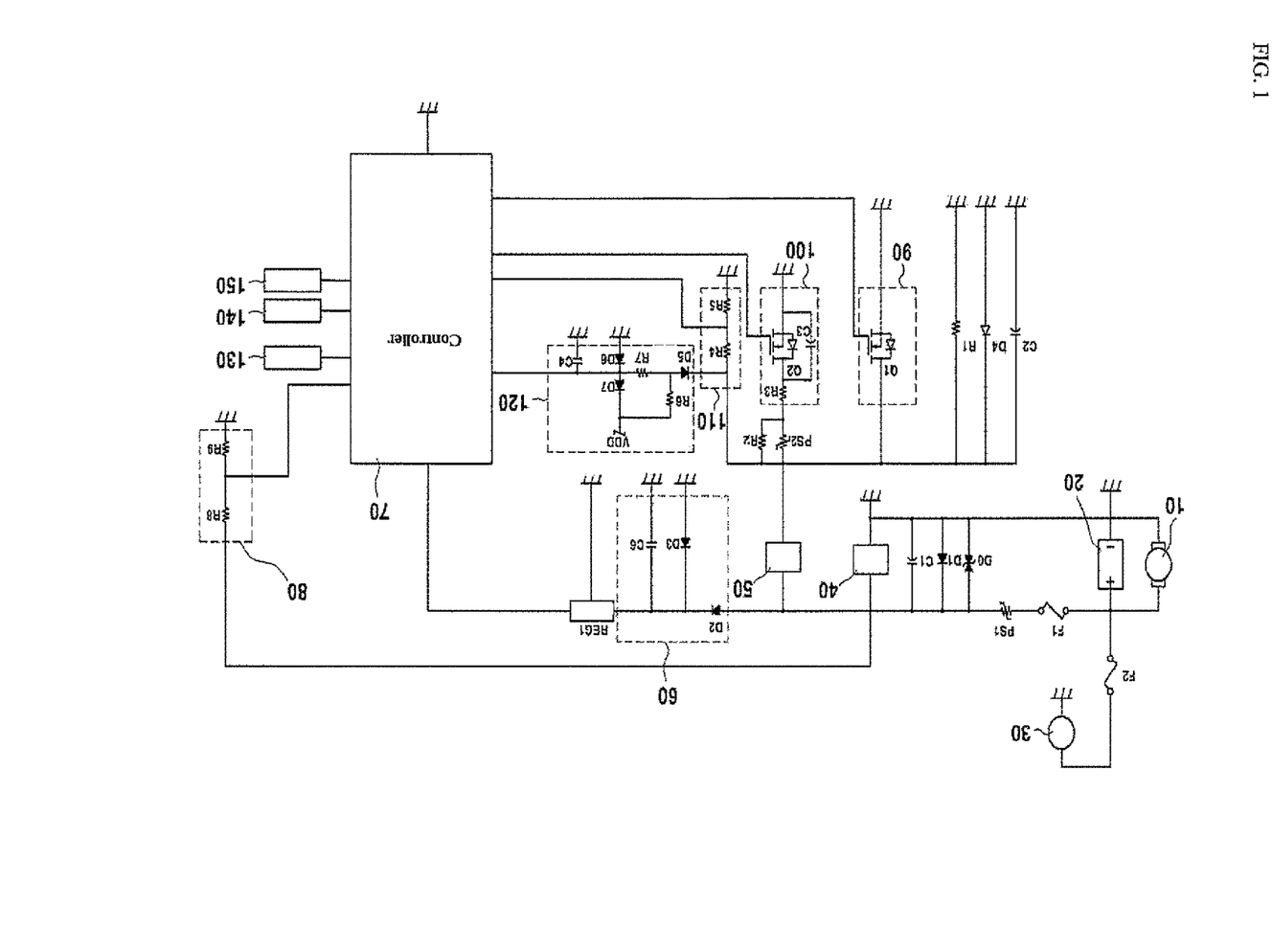
FIG. 1 is a circuit diagram of an apparatus for compensating power of a power supply device in a vehicle using a high-capacitance capacitor according to the present invention.

FIG. 1 is a circuit diagram of an apparatus for compensating power of a power supply device in a vehicle using a high-capacitance capacitor according to the present invention.

As shown, the apparatus for compensating power of the power supply device including a generator 10, a battery 20, and an electric load 30 includes a 1st EDLC module 40, a 2nd EDLC module 50, an instantaneous voltage decrease prevention unit 60, a controller 70, a battery voltage detector 80, a charge and discharge connection switching unit 90, a constant power charge switching unit 100, an EDLC module voltage detector 110, a discharge detector 120, a temperature detector 130, a setting unit 140, and a display unit 150. The battery 20 is connected in parallel to the generator 10. The electric load 30 receives power from the generator 10 and the battery 20. The 1st EDLC module 40 is connected in parallel to the battery 20 to perform charge and discharge operations and to compensate low-capacitance power. The 2nd EDLC module 50 is connected in parallel to the battery 20 to perform charge and discharge operations and to compensate high-capacitance power. The instantaneous voltage decrease prevention unit 60 blocks reverse current flow caused by instantaneous voltage decrease when the vehicle starts to reliably (or stably) supply operation power to the controller 70. The controller 70 receives operating power from the generator 10 and the battery 20 and controls overall operation of the power compensation apparatus. The battery voltage detector 80 detects voltage of the battery 20. The charge and discharge connection switching unit 90 is provided between the 2nd EDLC module 50 and ground to control charge and discharge operations of the 2nd EDLC module 50. The constant power charge switching unit 100 is switching-controlled to allow the 2nd EDLC module 50 to be charged with constant power when the 2nd EDLC module 50 performs a charge operation. The EDLC module voltage detector 110 detects a charged voltage of the 2nd EDLC module 50. The discharge detector 120 detects a discharge operation of the 2nd EDLC module 50. The temperature detector 130 detects ambient temperature of the 2nd EDLC module 50. The setting unit 140 includes various function setting keys. The display unit 150 displays errors, setting values, or the like.

More specifically, the 1st EDLC module 40 and the 2nd EDLC module 50 are connected to an output terminal of the battery 20 via an over-current protection element PS1, diodes D0 and D1, and an MPP capacitor C1.

Here, the over-current protection element PS1 is used to temporarily cut the circuitry off when over-current flows during charge and discharge of the 1st EDLC module 40 and the 2nd EDLC module 50, the diode D0 is used to prevent surge voltage, the diode D1 is used to prevent reverse voltage, and the MPP capacitor C1 is used for high-frequency filtering.

Figure 2:
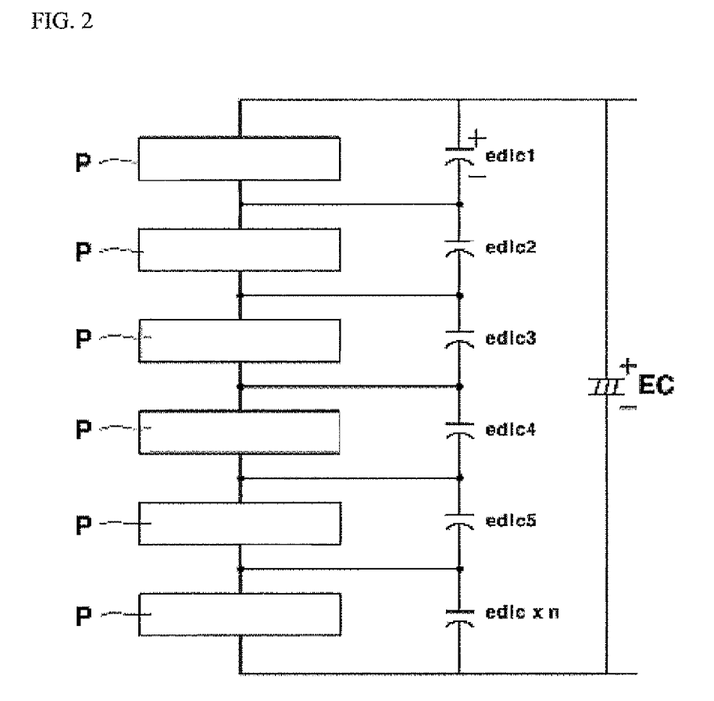
FIG. 2 is a circuit diagram of an EDLC module according to the present invention.

As shown in FIG. 2, each of the 1st EDLC module 40 and the 2nd EDLC module 50 includes a plurality of high-capacitance capacitors edlc 1 to edlc n which are connected in series, protection circuits P which are connected in parallel respectively to the plurality of high-capacitance capacitors edlc 1 to edlc n, and an electrolytic capacitor EC which is connected between both ends of the EDLC module.

The protection circuits P protect the high-capacitance capacitors by preventing voltage to which the high-capacitance capacitors are charged from exceeding a rated voltage and a detailed description thereof will be given later.

The 1st EDLC module 40 and the 2nd EDLC module 50 are charged with voltage of the generator 10 and the battery 20 and perform discharge operations when power compensation is performed. Here, the 1st EDLC module 40, which is a low-capacitance element, is responsible for such operations for several μs to several ms and the 2nd EDLC module 50, which is a high-capacitance element, is responsible for such operations for several ms to several seconds.

Figure 3:
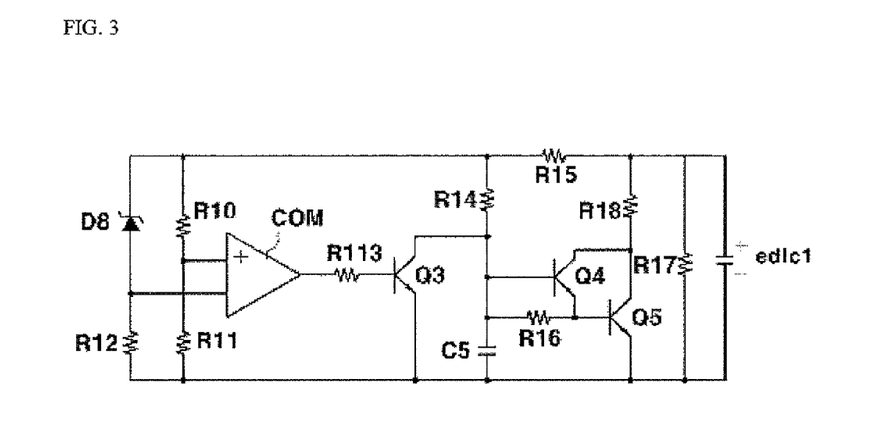
FIG. 3 is a detailed circuit diagram of a protection circuit of FIG. 2.

As shown in FIG. 3, each of the protection circuits P includes a comparator COM, 3rd, 4th, and 5th transistors Q3, Q4, and Q5, a Zener diode D8, a capacitor C5, 10th to 17th resistors R10 to R17, and a discharge resistor R18 wherein the 10th and 11th resistors R10 and R11 are connected to the comparator COM such that a divided voltage between the 10th and 11th resistors R10 and R11 is input as a comparison voltage to a 1st terminal (+) of the comparator COM, the Zener diode D8 and the 12th resistor R12 are connected to the comparator COM such that a divided voltage between the Zener diode D8 and the 12th resistor R12 is input as a reference voltage to a 2nd terminal (−) of the comparator COM, an output of the comparator COM is connected to a base of the 3rd transistor Q3 via the 13th resistor R13, a collector of the 3rd transistor Q3 is connected to a 1st terminal (+) of the 1st high-capacitance capacitor edlc 1 via the 14th resistor R14 and the 15th resistor R15 and is also connected to a base of the 5th transistor Q5 via a base of the 4th transistor Q4 and the 16th resistor R16, collectors of the 4th and 5th transistors Q4 and Q5 are connected to the 1st terminal (+) of the 1st high-capacitance capacitor edlc 1 via the discharge resistor R18, and an emitter of the 5th transistor Q5 is connected to a 2nd terminal of the 1st high-capacitance capacitor edlc 1.

Here, the 17th resistor R17 serves as a balance resistor.

Each of the protection circuits P constructed as described above operates in the following manner. First, when the 1st high-capacitance capacitor edlc 1 is charged to a normal voltage (for example, when a voltage less than 2.5V is applied to the 1st high-capacitance capacitor edlc 1 or when the 1st high-capacitance capacitor edlc 1 is stored to a voltage less than 2.5V), the divided voltage between the 10th resistor R10 and the 11th resistor R11 is higher than the reference voltage of the 12th resistor R12 and the Zener diode Z8. Accordingly, the comparator outputs a high-level signal, thereby turning the 3rd transistor Q3 on.

As the 3rd transistor Q3 is turned on, the 4th and 5th transistors are kept off such that current of the 1st high-capacitance capacitor edlc 1 flows between the collector and emitter of the 3rd transistor Q3 through the 15th resistor R15 and the 14th resistor R14.

When an excessive voltage (i.e., a voltage higher than 2.5V) is applied to the 1st high-capacitance capacitor edlc 1 in such a normal state, the Zener diode D8 is turned on such that the reference voltage produced through the 12th resistor R12 is higher than the divided voltage between the 10th resistor R10 and the 11th resistor R11. Accordingly, the comparator COM outputs a low-level signal, thereby turning the 3rd transistor Q3 off.

As the 3rd transistor Q3 is turned off, a high voltage is applied to the bases of the 4th and 5th transistors Q4 and Q5, thereby turning the 4th and 5th transistors Q4 and Q5 on.

As the 4th and 5th transistors are turned on, an excessive voltage applied to the 1st high-capacitance capacitor edlc 1 is quickly discharged through the discharge resistor R17.

Accordingly, the circuitry prevents an excessive voltage higher than a rated voltage from being applied to the high-capacitance capacitors edlc 1 to edlc n, thereby preventing damage to the high-capacitance capacitors and increasing the lifespan of the high-capacitance capacitors.

The instantaneous voltage decrease prevention unit 60 is connected to an output terminal of the battery 20 and includes reverse-flow blocking diodes D2 and D3 and a charging capacitor C6.

The instantaneous voltage decrease prevention unit 60 prevents a voltage to which the charging capacitor C6 has been charged from being applied backward to the battery 20 (or prevents charge stored in the charging capacitor C6 from flowing backward into the battery 20) due to instantaneous voltage decrease of the battery 20 when the vehicle starts to reliably (or stably) supply drive voltage to the controller 70.

Specifically, the reverse-flow blocking diodes D2 and D3 prevent a voltage to which the capacitor C6 has been charged from being applied backward to the battery 20 due to start of the vehicle.

The battery voltage detector 80 includes a resistor R8 and a resistor R9 and detects a terminal voltage of the battery 20 and inputs the detected terminal voltage to the controller 70.

The charge and discharge connection switching unit 90 includes a 1st Field Effect Transistor (FET) Q1.

The 1st FET Q1 is provided between one terminal (−) of the 2nd EDLC module 50 and ground and is turned on when the 2nd EDLC module 50 completes charging or performs discharging to allow the battery 20 and the 2nd EDLC module 50 to form a closed circuit.

The constant power charge switching unit 100 includes a resistor R3 and a 2nd FET Q2 which are connected in series.

The resistor R3 and the second FET Q2 are provided between the terminal (−) of the 2nd EDLC module 50 and ground. When the 2nd EDLC module 50 is charged, the 2nd FET Q2 is turned on to allow the battery 20 and the 2nd EDLC module 50 to form a closed circuit. Here, when the 2nd EDLC module 50 is charged, the 2nd FET Q2 operates in a constant-power pulse switching manner to allow the 2nd EDLC module 50 to be reliably (or stably) charged, taking into consideration a voltage difference between voltage of the battery 20 and the charged voltage of the 2nd EDLC module 50.

To operate the 2nd FET Q2 in the constant-power pulse switching manner, a pulse switching signal for constant power charging, which allows charging current to decrease proportionally as the voltage difference between the voltage of the battery 20 and the charged voltage of the 2nd EDLC module 50 increases, is applied to the 2nd FET Q2.

Accordingly, when the 2nd FET is turned on according to the pulse switching signal, current of the battery 20 flows into the 2nd EDLC module 50 through the 2nd FET Q2 and the resistor R3 such that the 2nd EDLC module 50 is charged with constant power.

The over-current protection element PS2 is provided between the constant power charge switching unit 100 and the 2nd EDLC module 50 to disconnect the constant power charge switching unit 100 and the 2nd EDLC module 50 from each other when over-current flows in the 2nd EDLC module 50 to prevent charging overload of the 2nd EDLC module 50 and overload of the generator 10.

The EDLC module voltage detector 110 includes a resistor R4 and a resistor R5 and detects voltage of the 2nd EDLC module 50 and inputs the detected voltage to the controller 70.

The discharge detector 120 includes two resistors R6 and R7, three diodes D5 to D7, and a capacitor C4 and detects a signal generated when the 2nd EDLC module 50 discharges and inputs the detected signal to the controller 70.

The discharge detector 120 operates in the following manner. First, when the charge and discharge connection switching unit 90 and the constant power charge switching unit 100 are off such that the circuitry is not in a charging or discharging state, a 0.5V signal is input to the controller 70 according to the forward voltage of the diode D5. However, when the 2nd EDLC module 50 discharges in a state in which the charge and discharge connection switching unit 90 and the constant power charge switching unit 100 are off or in a state in which a charging operation is performed (i.e., a pulse switching signal is being generated) through the constant power charge switching unit 100, a negative (−) voltage is applied to a cathode of the diode D5 while a voltage of 0.5V or less is applied to the controller 70. Here, the controller 70 detects that the 2nd EDLC module 50 is currently discharging.

Here, the diodes D6 and D7 are surge protection elements and the capacitor C4 is a noise preventing element.

According to the present invention, the diode D4 and the resistor R1 are provided between the 2nd EDLC module 50 and ground. Here, the diode D4 is an element for allowing discharge current to flow from the 2nd EDLC module 50 when the 2nd EDLC module 50 discharges large current and the resistor R1 is an element for allowing current to flow in the 2nd EDLC module 50 when small current charging or discharging of the 2nd EDLC module 50 is performed in a state in which the charge and discharge connection switching unit 90 and the constant power charge switching unit 100 are off.

Capacitors C2 and C3 which are not described above are elements for noise removal.

The following is a description of the configuration of the controller 70.

The controller 70 is an element that includes a program for controlling overall operation of the power compensation apparatus and performs control operations such as "charge standby mode", "charge and discharge mode", and "constant power charge mode" as described below.

<Charge Standby Mode>

When the terminal voltage of the battery 20 has increased from the previous terminal voltage by a first predetermined level (for example, 0.2 to 0.3V) or more (i.e., current terminal voltage≥previous terminal voltage+first predetermined level) or when the terminal voltage of the battery 20 has rapidly decreased from the previous terminal voltage by a second predetermined level (for example, 0.5V) or more (i.e., current terminal voltage≤previous terminal voltage−second predetermined level) while the voltage of the battery 20 detected through the battery voltage detector 80 is a normal reference voltage at which it is possible to charge the 2nd EDLC module 50, the controller 70 performs a charge standby mode in which the controller 70 outputs a low signal to the charge and discharge connection switching unit 90 and the constant power charge switching unit 100 to turn both the 1st FET Q1 and the 2nd FET Q2 off to disconnect the battery 20 and the 2nd EDLC module 50 from each other to temporarily prevent charge and discharge operations.

When the terminal voltage of the battery 20 has increased from the previous terminal voltage by a first predetermined level or more or when the terminal voltage of the battery 20 has rapidly decreased from the previous terminal voltage by a second predetermined level or more, the charge standby mode is performed to separate the battery 20 and the 2nd EDLC module 50 from each other to prevent excessive charge and discharge operations from being instantaneously generated, thereby preventing overload of the generator 10.

Here, when it is stated that the terminal voltage of the battery 20 is a normal reference voltage at which it is possible to perform charging, this indicates that the voltage of the battery 20 is not an over-charged voltage which is higher than a rated voltage or that the voltage of the battery 20 is not less than a discharge termination voltage. That is, it is stated that the terminal voltage of the battery 20 is a normal reference voltage when the battery 20 can be normally used.

In addition, the term "previous terminal voltage" of the battery 20 refers to a terminal voltage of the battery 20 which is previously stored before the current terminal voltage of the battery 20 is detected. That is, the term "previous terminal voltage" refers to a terminal voltage of the battery 20 which is stored immediately before the currently detected terminal voltage of the battery 20 from among a plurality of terminal voltages of the battery which vary starting from a terminal voltage of the battery detected when power is initially applied.

<Charge and Discharge Mode>

When the terminal voltage of the battery 20 is a normal reference voltage at which it is possible to perform charging and the terminal voltage of the battery 20 is in a normal state in which the terminal voltage of the battery 20 has not increased from the previous terminal voltage by a first predetermined level or more or the terminal voltage of the battery 20 has not rapidly decreased from the previous terminal voltage by a second predetermined level or more, the controller 70 performs a charge and discharge mode in which the controller 70 compares the terminal voltage of the battery 20 and a charged voltage of the 2nd EDLC module 50 detected through the EDLC module voltage detector 110 and outputs, upon determining that a voltage difference between the terminal voltage of the battery 20 and the detected charged voltage of the 2nd EDLC module 50 is less than a third predetermined level, a high signal to the charge and discharge connection switching unit 90 and the constant power charge switching unit 100 to turn both the 1st FET Q1 and the 2nd FET Q2 on to connect the battery 20 and the 2nd EDLC module 50 to each other to enable normal charge and discharge operations.

<Constant Power Charge Mode>

When the terminal voltage of the battery 20 is a normal reference voltage at which it is possible to perform charging and the terminal voltage of the battery 20 is in a normal state in which the terminal voltage of the battery 20 has not increased from the previous terminal voltage by a first predetermined level or more, the terminal voltage of the battery 20 has not rapidly decreased from the previous terminal voltage by a second predetermined level or more, or the power compensation apparatus is in the charge standby mode, the controller 70 performs a constant power charge mode in which the controller 70 compares the terminal voltage of the battery 20 and a charged voltage of the 2nd EDLC module 50 detected through the EDLC module voltage detector 110 and outputs, upon determining that a voltage difference between the terminal voltage of the battery 20 and the detected charged voltage of the 2nd EDLC module 50 is a third predetermined level or more, a low signal to the charge and discharge connection switching unit 90 to turn the 1st FET Q1 off to disconnect the battery 20 and the 2nd EDLC module 50 from each other and outputs a constant power pulse signal to the constant power charge switching unit 100 in order to charge the 2nd EDLC module 50 with constant power which is proportional to the detected voltage difference to switch the 2nd FET Q2 on or off accordingly.

Here, upon determining that the voltage difference between the battery 20 and the 2nd EDLC module 50 after performing the constant power charge mode, the controller 70 outputs a high signal to the charge and discharge connection switching unit 90 and the constant power charge switching unit 100 to turn both the 1st FET Q1 and the 2nd FET Q2 on to connect the battery 20 and the 2nd EDLC module 50 to each other, thereby enabling normal charge and discharge operations.

In addition, the controller 70 detects a value input to the controller 70 through the discharge detector 120. When the controller 70 detects a discharge operation of the 2nd EDLC module 50 based on the detected value, the controller 70 determines that the 2nd EDLC module 50 has been charged to a higher voltage than that to which the battery 20 has been charged and outputs a high signal to the charge and discharge connection switching unit 90 and the constant power charge switching unit 100 to turn both the 1st FET Q1 and the 2nd FET Q2 on to connect the battery 20 and the 2nd EDLC module 50 to each other, thereby enabling normal charge and discharge operations.

Figure 4:
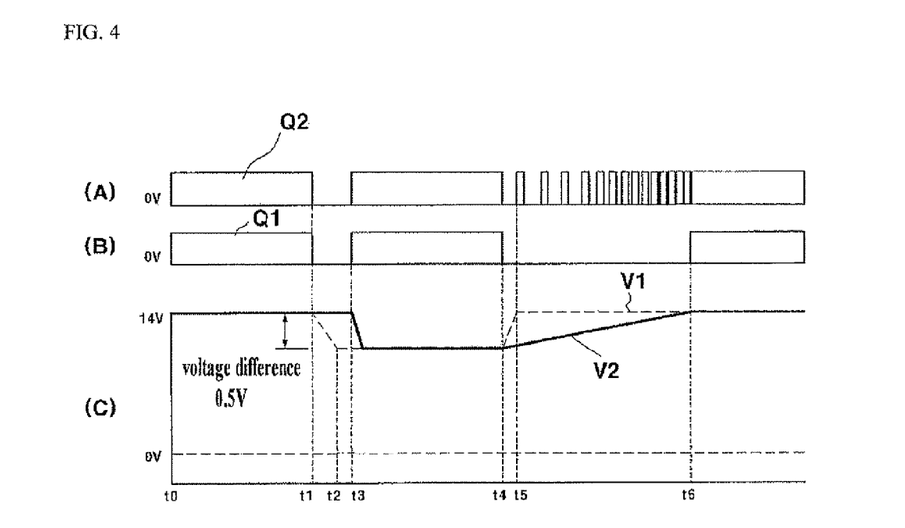
FIG. 4 is a timing diagram illustrating main parts of an apparatus for compensating power of a power supply device in a vehicle using a high-capacitance capacitor according to the present invention.

FIG. 4 is a timing diagram illustrating a control method when the voltage of the battery 20 has rapidly decreased by a second predetermined level or more.

As shown in FIG. 4, in a duration between time t0 and time t1, a terminal voltage V1 of the battery 20 and a charged voltage V2 of the 2nd EDLC module 50 are in a normal state (i.e., a charge completion state) in which the terminal voltage V1 and the charged voltage V2 are equal to each other, the controller 70 outputs a high signal to the charge and discharge connection switching unit 90 and the constant power charge switching unit 100 to keep the 1st FET Q1 and the 2nd FET Q2 on (see waveforms of FIGS. 4(A) and (B)). This is referred to as a "charge and discharge mode".

Accordingly, the battery 20 and the 2nd EDLC module 50 form a closed circuit such that the charged voltage of the 2nd EDLC module 50 provides an environment that can compensate power as the voltage of the battery 20 changes.

In this state, when the terminal voltage V1 of the battery 20 has rapidly decreased by a second predetermined level or more, i.e., when the value input from the battery voltage detector 80 has been reduced, the controller 70 outputs a low signal to the charge and discharge connection switching unit 90 and the constant power charge switching unit 100 to turn the 1st PET Q1 and the 2nd FET Q2 off. Accordingly, the battery 20 and the 2nd EDLC module 50 are disconnected from each other, thereby maintaining a charge standby state. This is referred to as a "charge standby mode".

Here, although the waveforms of FIG. 4 show only an example in which the terminal voltage of the battery 20 rapidly decreases by a second predetermined reference level or more, the controller 70 performs the same control to enter the charge standby mode when the terminal voltage of the battery 20 has increased by a first predetermined level or more.

The charge standby mode is performed to temporarily prevent a charge operation of the 2nd EDLC module 50 when the voltage of the battery 20 has rapidly increased or decreased due to an environmental cause of the electric load 30, thereby preventing overload of the generator 10.

Accordingly, after the 1st FET Q1 and the 2nd FET Q2 are turned off at time t1, the 2nd EDLC module 50 is slightly discharged through the discharge resistor R1.

Thereafter, when the charged voltage V2 of the 2nd EDLC module 50 starts decreasing at time t3, the controller 70 again outputs a high signal to the charge and discharge connection switching unit 90 and the constant power charge switching unit 100 to turn the 1st FET Q1 and the 2nd FET Q2 on. This is referred to as a "charge and discharge mode".

Thereafter, the 2nd EDLC module 50 rapidly discharges current to the battery 20 such that the charged voltage V2 of the 2nd EDLC module 50 rapidly decreases and the voltage of the battery 20 restarts increasing at time t4 as the generator 10 supplies voltage (or power).

When the voltage of the battery 20 starts increasing at time t4 in this manner, the controller 70 outputs a low signal to the charge and discharge connection switching unit 90 and the constant power charge switching unit 100 to turn the 1st FET Q1 and the 2nd FET Q2 off.

When time t5 at which the voltage of the battery 20 becomes a normal reference voltage state is reached after the voltage of the battery 20 restarts increasing, the controller 70 again charges the 2nd EDLC module 50.

Here, in one method of charging the 2nd EDLC module 50, the constant power charge switching unit 100 is driven in a constant power pulse switching manner in an interval between time t5 and time t6 to allow the 2nd EDLC module 50 to be charged with stable (or reliable) constant power, taking into consideration the voltage difference between the terminal voltage V1 of the battery 20 and the charged voltage V2 of the 2nd EDLC module 50. Here, the controller 70 outputs a low signal to the charge and discharge connection switching unit 90 to keep the 1st FET Q1 off and outputs, to the constant power charge switching unit 100, a pulse switching signal for constant power charging, which allows charging current to decrease proportionally as the voltage difference between the terminal voltage V1 of the battery 20 and the charged voltage V2 of the 2nd EDLC module 50 increases, such that the 2nd EDLC module 50 is charged with stable constant power rather than being rapidly charged. This is referred to as a "constant power charge mode".

Thereafter, at time t6 at which the charged voltage V2 of the 2nd EDLC module 50 is equal to the voltage V1 of the battery 20, the controller 70 outputs a high signal to the charge and discharge connection switching unit 90 and the constant power charge switching unit 100 to turn the 1st FET Q1 and the 2nd FET Q2 on.

Figure 5:
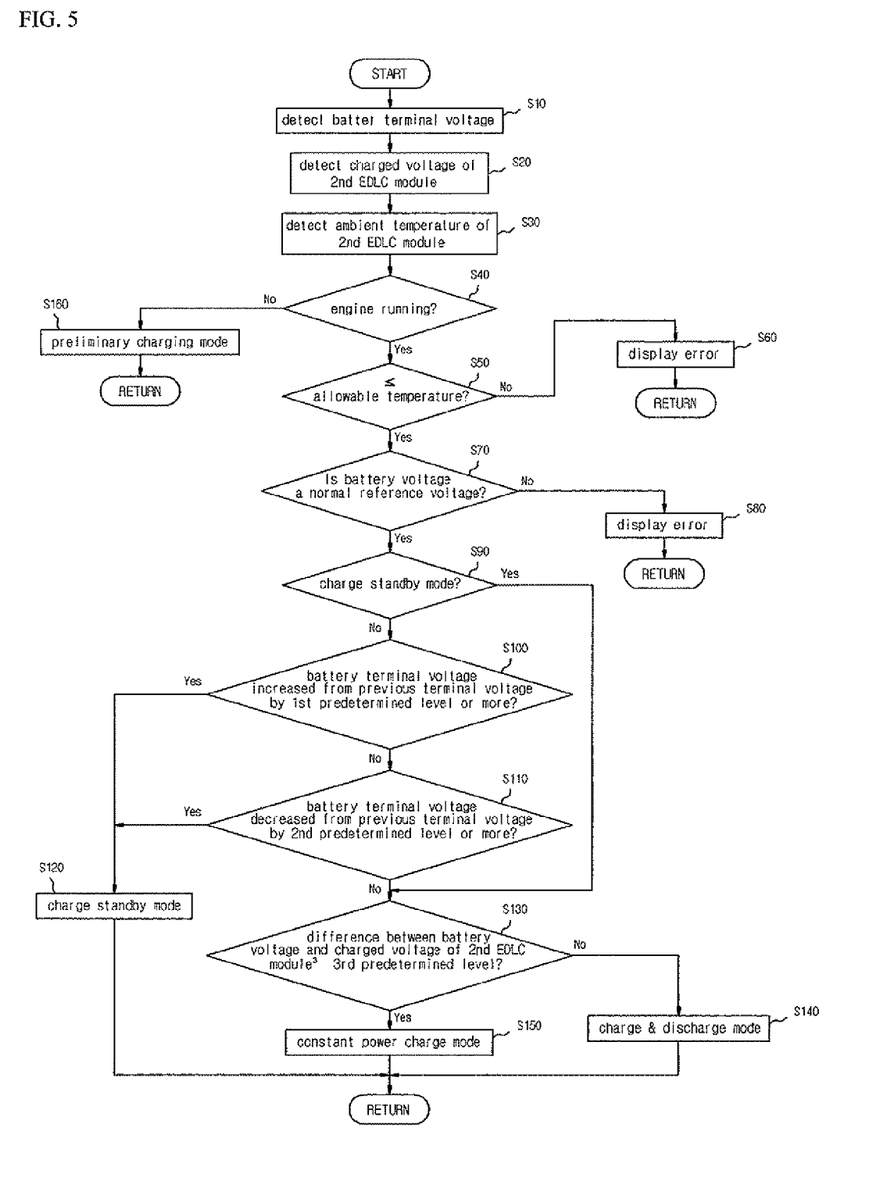
FIG. 5 is a flowchart of a method for compensating power of a power supply device in a vehicle using a high-capacitance capacitor according to the present invention.

FIG. 5 is a flowchart of a method for compensating power of a power supply device in a vehicle using a high-capacitance capacitor according to the present invention.

As shown, the method for compensating power of a power supply device in a vehicle using a high-capacitance capacitor according to the present invention includes a 1st process S10 including a controller 70 detecting and storing a terminal voltage of a battery 20 through a battery voltage detector 80, a 2nd process S20 including the controller 70 detecting and storing a charged voltage of a 2nd EDLC module 50 through an EDLC module voltage detector 110, a 3rd process S30 including the controller 70 detecting and storing an ambient temperature of the 2nd EDLC module 50 through a temperature detector 130, a 4th process S40 including the controller 70 detecting whether or not a vehicle engine is running through the battery voltage detector 80, a 5th process S50 including the controller 70 determining whether or not the ambient temperature of the 2nd EDLC module 50 is equal to or less than an allowable temperature value upon determining in the 4th process S40 that the vehicle engine is running, a 6th process S60 including the controller 70 outputting a corresponding error indication to a display unit 150 upon determining in the 5th process S50 that the ambient temperature of the 2nd EDLC module 50 is not equal to or less than the allowable temperature value, a 7th process S70 including the controller 70 determining whether or not the terminal voltage of the battery 20 is a normal reference voltage which it is possible to perform charging upon determining in the 5th process S50 that the ambient temperature of the 2nd EDLC module 50 is equal to or less than the allowable temperature value, an 8th process S80 including the controller 70 outputting a corresponding error indication to the display unit 150 upon determining in the 7th process S70 that the terminal voltage of the battery 20 is not a normal reference voltage at which it is possible to perform charging, a 9th process S90 including the controller 70 determining whether or not a current mode is a charge standby mode upon determining in the 7th process S70 that the terminal voltage of the battery 20 is a normal reference voltage at which it is possible to perform charging, a 10th process S100 including the controller 70 determining whether or not the terminal voltage of the battery 20 has increased from a previous terminal voltage thereof by a first predetermined level or more (i.e., current terminal voltage≥previous terminal voltage+first predetermined level) upon determining in the 9th process S90 that the current mode is not the charge standby mode, an 11th process S110 including the controller 70 determining whether or not the terminal voltage of the battery 20 has rapidly decreased from a previous terminal voltage thereof by a second predetermined level or more (i.e., current terminal voltage≤previous terminal voltage−second predetermined level) upon determining in the 10th process S100 that the terminal voltage of the battery 20 has not increased from the previous terminal voltage thereof by the first predetermined level or more, a 12th process S120 including the controller 70 performing a charge standby mode, in which the controller 70 outputs a low signal to the charge and discharge connection switching unit 90 and the constant power charge switching unit 100 to disconnect the battery 20 and the 2nd EDLC module 50 from each other to temporarily prevent charge and discharge operations, upon determining in the 10th process S100 that the terminal voltage of the battery 20 has increased from the previous terminal voltage thereof by the first predetermined level or more or upon determining in the 11th process S110 that the terminal voltage of the battery 20 has rapidly decreased from the previous terminal voltage thereof by the second predetermined level or more, a 13th process S130 including the controller 70 comparing the terminal voltage of the battery 20 and the charged voltage of the 2nd EDLC module 50 and determining whether or not a voltage difference therebetween is a third predetermined level or more upon determining in the 9th process S90 that the current mode is the charge standby mode, upon determining in the 10th process S100 that the terminal voltage of the battery 20 has not increased from the previous terminal voltage thereof by the first predetermined level or more, or upon determining in the 11th process S110 that the terminal voltage of the battery 20 has not rapidly decreased from the previous terminal voltage thereof by the second predetermined level or more, a 14th process S140 including the controller 70 performing a charge and discharge mode, in which the controller 70 outputs a high signal to the charge and discharge connection switching unit 90 and the constant power charge switching unit 100 to connect the battery 20 and the 2nd EDLC module 50 to each other to enable normal charge and discharge operations, upon determining in the 13th process S130 that the voltage difference between the terminal voltage of the battery 20 and the charged voltage of the 2nd EDLC module 50 is zero, and a 15th process S150 including the controller 70 performing a constant power charge mode in which the controller 70 outputs a low signal to the charge and discharge connection switching unit 90 to disconnect the battery 20 and the 2nd EDLC module 50 from each other and outputs a constant power pulse signal to the constant power charge switching unit 100 in order to charge the 2nd EDLC module 50 with constant power which is proportional to the voltage difference upon determining in the 13th process S130 that the voltage difference between the terminal voltage of the battery 20 and the charged voltage of the 2nd EDLC module 50 is the third predetermined level or more and outputs, when the voltage difference between the terminal voltage of the battery 20 and the charged voltage of the 2nd EDLC module 50 has dropped to zero after outputting the constant power pulse signal, a high signal to the charge and discharge connection switching unit 90 and the constant power charge switching unit 100 to connect the battery 20 and the 2nd EDLC module 50 to each other to enable normal charge and discharge operations.

The 4th process S40 further includes a 16th process S160 including entering a preliminary charging mode upon determining that the vehicle engine is not running.

In the 4th process S40, the controller 70 determines whether or not the vehicle engine is running through the battery voltage detector 80. When the engine has not started, the terminal voltage of the battery 20 is equal to the product of the number of cells and about 2.1V. When the engine has started, the battery 20 undergoes voltage instability such as voltage reduction during a certain initial period. However, as the engine starts, the generator 10 is activated to increase the charged voltage of the battery 20 by 7% to 15% of the product of about 2.1V and the number of cells. Thus, the generator 10 supplies a voltage in a range of about 0.9 to 2V.

The controller 70 detects such voltage differences to determine whether the engine is currently running or has not started.

Figure 6:
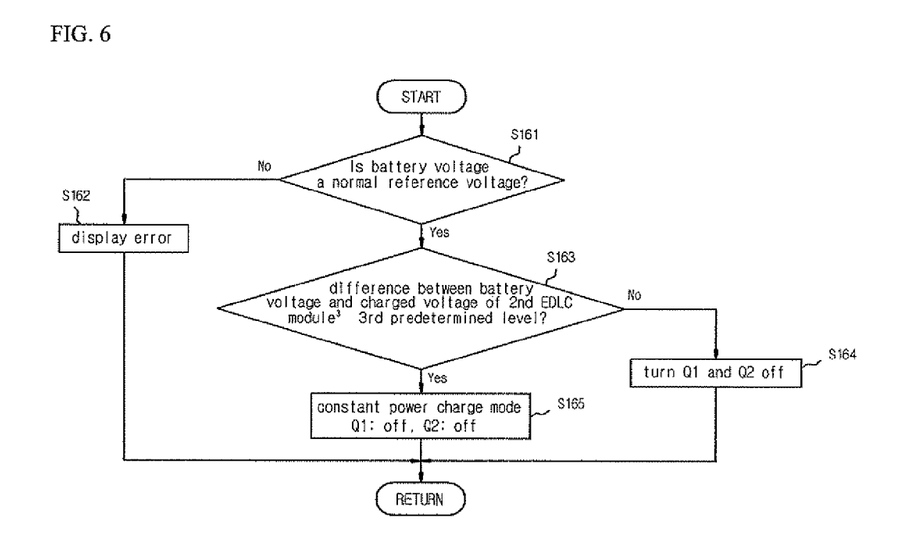
FIG. 6 is a flowchart of a preliminary charging mode in FIG. 5.

As shown in FIG. 6, the 16th process S160, which is a process of performing the preliminary charging mode, includes the steps of S161) the controller 70 determining whether or not the terminal voltage of the battery 20 is a normal reference voltage at which it is possible to perform charging, S162) outputting a corresponding error indication to the display unit 150 upon determining in step S161 that the terminal voltage of the battery 20 is not a normal reference voltage at which it is possible to perform charging, S163) comparing the terminal voltage of the battery 20 and the charged voltage of the 2nd EDLC module 50 and determining whether or not a voltage difference therebetween is a third predetermined level or more upon determining in step S161 that the terminal voltage of the battery 20 is a normal reference voltage at which it is possible to perform charging, S164) outputting a low signal to the charge and discharge connection switching unit 90 and the constant power charge switching unit 100 to disconnect the battery 20 and the 2nd EDLC module 50 from each other upon determining that the voltage difference between the terminal voltage of the battery 20 and the charged voltage of the 2nd EDLC module 50 is not the third predetermined level or more, and S165) outputting a low signal to the charge and discharge connection switching unit 90 to disconnect the battery 20 and the 2nd EDLC module 50 from each other and outputting a constant power pulse signal to the constant power charge switching unit 100 in order to charge the 2nd EDLC module 50 with constant power which is proportional to the voltage difference upon determining in step S163 that the voltage difference between the terminal voltage of the battery 20 and the charged voltage of the 2nd EDLC module 50 is the third predetermined level or more and outputting, when the voltage difference between the terminal voltage of the battery 20 and the charged voltage of the 2nd EDLC module 50 has dropped to zero after outputting the constant power pulse signal, a low signal to the charge and discharge connection switching unit 90 and the constant power charge switching unit 100 to disconnect the battery 20 and the 2nd EDLC module 50 from each other.

Figure 7:
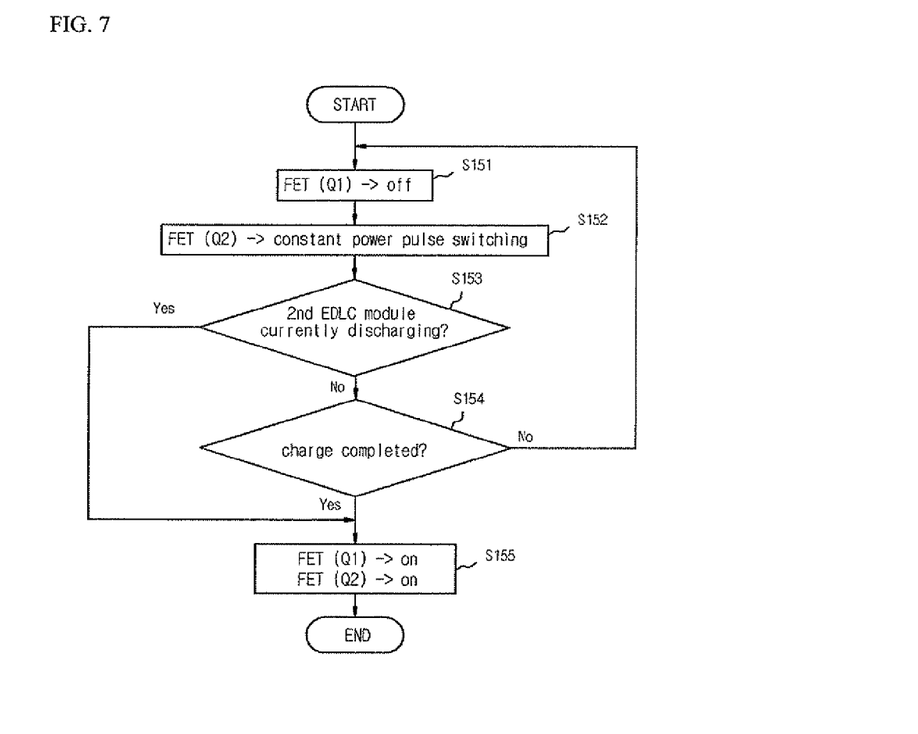
FIG. 7 is a flowchart of a constant power charge mode in FIG. 5.

As shown in FIG. 7, the 15th process S150, which is a process of performing the constant power charge mode, includes the steps of S151) the controller 70 outputting a low signal to the charge and discharge connection switching unit 90 to turn the 1st FET Q1 off, S152) outputting a constant power pulse signal to the constant power charge switching unit 100 in order to charge the 2nd EDLC module 50 with constant power which is proportional to the voltage difference between the battery 20 and the 2nd EDLC module 50 to switch the 2nd FET Q2, S153) determining whether or not the 2nd EDLC module 50 is discharging through the discharge detector 120, S154) determining whether or not the 2nd EDLC module 50 has been completely charged upon determining in step S153 that the 2nd EDLC module 50 is not discharging, and S155) outputting a high signal to the charge and discharge connection switching unit 90 and the constant power charge switching unit 100 to connect the battery 20 and the 2nd EDLC module 50 to each other upon determining in step S153 that the 2nd EDLC module 50 is discharging or upon determining in step S154 that the 2nd EDLC module 50 has been completely charged.

The following is a description of overall operation of the apparatus for compensating power of a power supply device in a vehicle using a high-capacitance capacitor constructed as described above.

First, when power of the battery 20 is applied to the power compensation apparatus, the power is applied to the 1st EDLC module 40 and the 2nd EDLC module 50 via the over-current protection element PS1, the diodes D0 and D1 and the MPP capacitor C1 and is also applied as drive voltage to the controller 70 via the instantaneous voltage decrease prevention unit 60 and the regulator REG1.

Accordingly, when the controller 70 is initialized, the controller 70 detects and stores a terminal voltage of the battery 20 through the battery voltage detector 80 (S10).

The controller 70 then detects a charged voltage of the 2nd EDLC module 50 through the EDLC module voltage detector 110 (S20). Here, the controller 70 detects and stores the charged voltage of the 2nd EDLC module 50 using the difference between a voltage input through the battery voltage detector 80 and a value input through the EDLC module voltage detector 110.

The controller 70 then detects and stores an ambient temperature of the 2nd EDLC module 50 through the temperature detector 130.

When such detection is completed, the controller 70 determines whether or not the vehicle engine is currently running through the terminal voltage of the battery 20 detected through the battery voltage detector 80. That is, the controller 70 determines whether or not the engine has started (S40).

Here, upon determining that the engine is currently running, the controller 70 determines whether or not the ambient temperature of the 2nd EDLC module 50 detected through the temperature detector 130 is an allowable temperature value or less. Upon determining that the ambient temperature of the 2nd EDLC module 50 detected through the temperature detector 130 is not the allowable temperature value or less, the controller 70 determines that it is difficult to perform normal charge and discharge operations and outputs a corresponding error indication to the display unit 150 and stops operation of the power compensation apparatus (S50, S60).

Upon determining that the ambient temperature of the 2nd EDLC module 50 detected through the temperature detector 130 is the allowable temperature value or less, the controller 70 determines whether or not the terminal voltage of the battery 20 is a normal reference voltage at which it is possible to perform charging (S70).

Here, when it is stated that the terminal voltage of the battery 20 is a normal reference voltage at which it is possible to perform charging, this indicates that the voltage of the battery 20 is not an over-charged voltage which is higher than a rated voltage or that the voltage of the battery 20 is not less than a discharge termination voltage.

Accordingly, when the terminal voltage of the battery 20 is not a normal reference voltage at which it is possible to perform charging, the controller 70 determines that it is difficult to perform normal charge and discharge operations and outputs a corresponding error indication to the display unit 150 and stops operation of the power compensation apparatus (S80).

However, when the terminal voltage of the battery 20 is a normal reference voltage at which it is possible to perform charging, the controller 70 determines whether or not a current mode is a charge standby mode (S90).

Here, when the current mode is not the charge standby mode, the controller 70 determines whether or not the terminal voltage of the battery 20 has increased from a previous terminal voltage thereof by a first predetermined level or more (i.e., current terminal voltage previous terminal voltage first predetermined level) or has rapidly decreased from a previous terminal voltage thereof by a second predetermined level or more (i.e., current terminal voltage≤previous terminal voltage−second predetermined level). Upon determining that the terminal voltage of the battery 20 has increased from a previous terminal voltage thereof by a first predetermined level or more or has rapidly decreased from a previous terminal voltage thereof by a second predetermined level or more, the controller 70 outputs a low signal to the charge and discharge connection switching unit 90 and the constant power charge switching unit 100 to disconnect the battery 20 and the 2nd EDLC module 50 from each other to perform the charge standby mode which temporarily prevents charge and discharge operations (S100 to S120).

However, upon determining that the terminal voltage of the battery 20 has not increased from a previous terminal voltage thereof by a first predetermined level or more or has not rapidly decreased from a previous terminal voltage thereof by a second predetermined level or more, the controller 70 compares the terminal voltage of the battery 20 and the charged voltage of the 2nd EDLC module 50 and determines whether or not there is a voltage difference therebetween (S130).

Here, upon determining that there is no voltage difference between the terminal voltage of the battery 20 and the charged voltage of the 2nd EDLC module 50, the controller 70 outputs a high signal to the charge and discharge connection switching unit 90 and the constant power charge switching unit 100.

Accordingly, the controller 70 performs a charge and discharge mode in which the 1st FET Q1 and the 2nd FET Q2 are turned on to connect the battery 20 and the 2nd EDLC module 50 to enable normal charge and discharge operations (S140).

On the other hand, upon determining that there is a voltage difference between the terminal voltage of the battery 20 and the charged voltage of the 2nd EDLC module 50 (which is a third predetermined level or higher), the controller 70 outputs a low signal to the charge and discharge connection switching unit 90 to turn the 1st FET Q1 off to disconnect the battery 20 and the 2nd EDLC module 50 from each other and outputs a constant power pulse signal to the constant power charge switching unit 100 in order to charge the 2nd EDLC module 50 with constant power which is proportional to the voltage difference.

Accordingly, the 2nd FET Q2 is turned on/off by the constant power pulse switching signal to start charging the 2nd EDLC module 50. Thereafter, when the charged voltage of the 2nd EDLC module 50 and the terminal voltage of the battery 20 become equal, the controller 70 outputs a high signal to both the charge and discharge connection switching unit 90 and the constant power charge switching unit 100 to connect the battery 20 and the 2nd EDLC module 50 to each other, thereby enabling normal charge and discharge operations.

Thereafter, the controller 70 performs a constant power charge mode in which, when the voltage difference between the battery 20 and the 2nd EDLC module 50 drops to zero, the controller 70 outputs a high signal to the charge and discharge connection switching unit 90 and the constant power charge switching unit 100 to connect the battery 20 and the 2nd EDLC module 50 to each other to enable normal charge and discharge operations (S150).

During such an operation, upon determining that the vehicle engine has not started through the terminal voltage of the battery 20 detected through the battery voltage detector 80, the controller 70 performs a preliminary charging mode (S160).

The preliminary charging mode is to perform an operation for charging the 2nd EDLC module 50 to voltage of the battery 20 in advance before the vehicle engine starts.

The operation of the preliminary charging mode is performed in the following manner.

Upon determining that the engine is not running, the controller 70 determines whether or not the terminal voltage of the battery 20 is a normal reference voltage at which it is possible to perform charging (S161).

Here, upon determining that the terminal voltage of the battery 20 is not a normal reference voltage at which it is possible to perform charging, the controller 70 determines that it is difficult to perform normal charge and discharge operations and outputs a corresponding error indication to the display unit 150 and stops operation of the power compensation apparatus (S162).

However, when the terminal voltage of the battery 20 is a normal reference voltage at which it is possible to perform charging, the controller 70 compares the terminal voltage of the battery 20 input through the battery voltage detector 80 and the charged voltage of the 2nd EDLC module 50 input through the EDLC module voltage detector 110 and determines the voltage difference therebetween (S163).

Here, upon determining that the voltage difference between the terminal voltage of the battery 20 and the charged voltage of the 2nd EDLC module 50 is not a third predetermined level or more, the controller 70 outputs a low signal to the charge and discharge connection switching unit 90 and the constant power charge switching unit 100 to separate the battery 20 and the 2nd EDLC module 50 from each other to maintain the standby state (S164).

On the other hand, upon determining that the voltage difference between the terminal voltage of the battery 20 and the charged voltage of the 2nd EDLC module 50 is the third predetermined level or more, the controller 70 outputs a low signal to the charge and discharge connection switching unit 90 to disconnect the battery 20 and the 2nd EDLC module 50 from each other and outputs a constant power pulse signal to the constant power charge switching unit 100 in order to charge the 2nd EDLC module 50 with constant power which is proportional to the voltage difference. Thereafter, when the voltage difference between the terminal voltage of the battery 20 and the charged voltage of the 2nd EDLC module 50 has dropped to zero, the controller 70 outputs a low signal to the charge and discharge connection switching unit 90 and the constant power charge switching unit 100 to separate the battery 20 and the 2nd EDLC module 50 from each other to maintain the standby state (S165).

As is apparent from the above description, according to the present invention, when voltage output from a generator and a battery in a vehicle has temporarily dropped while the vehicle is traveling, the high-capacitance capacitor rapidly discharges current to compensate power.

In addition, the high-capacitance capacitor is charged in a constant power pulse charging manner to prevent voltage instability of the battery due to overload of the generator caused when the high-capacitance capacitor is charged.

Further, in the case in which terminal voltage of the battery has been reduced due to an electrical load in the vehicle when the high-capacitance capacitor is charged, the high-capacitance capacitor is temporarily stopped from being charged and discharges current to compensate power of the electrical load of the vehicle.

Accordingly, the present invention has advantages in that, when the vehicle travels, power supply instability such as voltage decrease is compensated for in real time to improve output of the vehicle and to prevent temporary deceleration, thereby not only improving driving characteristics of the vehicle but also significantly increasing fuel efficiency and performance and lifespan of various electric parts.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for compensating power of a power supply device in a vehicle using a high-capacitance capacitor, the power supply device including a generator for the vehicle, a battery connected in parallel to the generator, and an electric load that receives power from the generator and the battery, the apparatus comprising:
   a 1st EDLC module connected in parallel to the battery to perform charge and discharge operations and to compensate low-capacitance power;
   a 2nd EDLC module connected in parallel to the battery to perform charge and discharge operations and to compensate high-capacitance power;
   a controller that receives operating power from the generator and the battery and controls overall operation of the apparatus;
   a battery voltage detector that detects voltage of the battery;
   a charge and discharge connection switching unit provided between the 2nd EDLC module and ground to control charge and discharge operations of the 2nd EDLC module;
   a constant power charge switching unit that is controlled to allow the 2nd EDLC module to be charged with constant power when the 2nd EDLC module performs a charge operation;
   an EDLC module voltage detector that detects a charged voltage of the 2nd EDLC module; and
   a discharge detector that detects a discharge operation of the 2nd EDLC module,
   wherein, when a terminal voltage of the battery has increased from a previous terminal voltage thereof by a first predetermined level or more or when the terminal voltage of the battery has rapidly decreased from the previous terminal voltage by a second predetermined level or more while the voltage of the battery detected through the battery voltage detector is a normal reference voltage at which it is possible to charge the 2nd EDLC module, the controller performs a charge standby mode in which the controller outputs a low signal to the charge and discharge connection switching unit and the constant power charge switching unit to disconnect the battery and the 2nd EDLC module from each other to temporarily prevent charge and discharge operations, when the terminal voltage of the battery is a normal reference voltage at which it is possible to perform charging and the terminal voltage of the battery is in a normal state in which the terminal voltage of the battery has not increased from the previous terminal voltage by the first predetermined level or more or the terminal voltage of the battery has not rapidly decreased from the previous terminal voltage by the second predetermined level or more, the controller performs a charge and discharge mode in which the controller compares the terminal voltage of the battery and a charged voltage of the 2nd EDLC module detected through the EDLC module voltage detector, and outputs, upon determining that a voltage difference between the terminal voltage of the battery and the detected charged voltage of the 2nd EDLC module is zero, a high signal to the charge and discharge connection switching unit and the constant power charge switching unit to connect the battery and the 2nd EDLC module to each other to enable normal charge and discharge operations, and when the terminal voltage of the battery is a normal reference voltage at which it is possible to perform charging and the terminal voltage of the battery is in a normal state in which the terminal voltage of the battery has not increased from the previous terminal voltage by the first predetermined level or more, the terminal voltage of the battery has not rapidly decreased from the previous terminal voltage by the second predetermined level or more, or the apparatus is in the charge standby mode, the controller performs a constant power charge mode in which the controller compares the terminal voltage of the battery and a charged voltage of the 2nd, EDLC module detected through the EDLC module voltage detector, and outputs, upon determining that a voltage difference between the terminal voltage of the battery and the detected charged voltage of the 2nd EDLC module is a third predetermined level or more, a low signal to the charge and discharge connection switching unit to disconnect the battery and the 2nd EDLC module from each other and outputs a constant power pulse signal to the constant power charge switching unit in order to charge the 2nd EDLC module with constant power which is proportional to the detected voltage difference.

2. The apparatus according to claim 1, wherein each of the 1st EDLC module and the 2nd EDLC module includes a plurality of high-capacitance capacitors which are connected in series, protection circuits which are connected in parallel respectively to the plurality of high-capacitance capacitors, and an electrolytic capacitor which is connected between both ends of the plurality of high-capacitance capacitors.

3. The apparatus according to claim 2, wherein each of the protection circuits includes a comparator, 3rd, 4th, and 5th transistors, a Zener diode, and a capacitor wherein 10th and 11th resistors are connected to the comparator such that a divided voltage between the 10th and 11th resistors is input as a comparison voltage to a 1st terminal of the comparator, the Zener diode and a 12th resistor are connected to the comparator such that a divided voltage between the Zener diode and the 12th resistor is input as a reference voltage to a 2nd terminal of the comparator, an output of the comparator is connected to a base of the 3rd transistor via a 13th resistor, a collector of the 3rd transistor is connected to a 1st terminal of the 1st high-capacitance capacitor via a 14th resistor and a 15th resistor and is also connected to a base of the 5th transistor via a base of the 4th transistor and a 16th resistor, collectors of the 4th and 5th transistors are connected to the 1st terminal of the 1st high-capacitance capacitor via a discharge resistor, and an emitter of the 5th transistor Q5 is connected to a 2nd terminal of the 1st high-capacitance capacitor.

4. The apparatus according to claim 1, further comprising a instantaneous voltage decrease prevention unit including at least one diode and a capacitor between the controller and a power supply terminal of the battery.

5. The apparatus according to claim 1, wherein the charge and discharge connection switching unit includes a 1st Field Effect Transistor (FET).

6. The apparatus according to claim 1, wherein the constant power charge switching unit includes a resistor and a 2nd FET which are connected in series.

7. The apparatus according to claim 1, wherein the discharge detector includes at least one resistor, at least one diode, and a capacitor.

8. The apparatus according to claim 1, wherein a temperature detector that detects an ambient temperature of the 2nd EDLC module, a setting unit including various function setting keys, and a display unit that displays information associated with errors and setting value are further connected to the controller.

9. The apparatus according to claim 1, wherein an overcurrent protection element is further connected between the battery and the 1st EDLC module.

10. The apparatus according to claim 1, wherein a diode and a resistor are provided between the 2nd EDLC module and ground to allow current to flow in the 2nd EDLC module when large current discharging or small current charging or discharging of the 2nd EDLC module is performed.

11. The apparatus according to claim 1, wherein an overcurrent protection element is provided between the constant power charge switching unit and the 2nd EDLC module.

12. A method for compensating power of a power supply device including a generator, a battery, and an electric load in a vehicle using a high-capacitance capacitor, the method being applied to an apparatus for compensating power of the power supply device, the apparatus including a 1st EDLC module, a 2nd EDLC module, a controller, a battery voltage detector, a charge and discharge connection switching unit, a constant power charge switching unit, an EDLC module voltage detector, a discharge detector, a temperature detector, a setting unit, and a display unit, the method comprising:

the controller detecting and storing a terminal voltage of the battery through the battery voltage detector;

detecting and storing a charged voltage of the 2nd EDLC module through the EDLC module voltage detector;

detecting and storing an ambient temperature of the 2nd EDLC module through the temperature detector;

detecting whether or not a vehicle engine is running through the battery voltage detector;

determining whether or not the ambient temperature of the 2nd EDLC module is equal to or less than an allowable temperature value upon determining that the vehicle engine is running;

outputting a corresponding error indication to the display unit upon determining that the ambient temperature of the 2nd EDLC module is not equal to or less than the allowable temperature value;

determining whether or not the terminal voltage of the battery is a normal reference voltage which it is possible to perform charging upon determining that the ambient temperature of the 2nd EDLC module is equal to or less than the allowable temperature value;

outputting a corresponding error indication to the display unit upon determining that the terminal voltage of the battery is not a normal reference voltage at which it is possible to perform charging;

determining whether or not a current mode is a charge standby mode upon determining that the terminal voltage of the battery is a normal reference voltage at which it is possible to perform charging;

determining whether or not the terminal voltage of the battery has increased from a previous terminal voltage thereof by a first predetermined level or more upon determining that the current mode is not the charge standby mode;

determining whether or not the terminal voltage of the battery has rapidly decreased from a previous terminal voltage thereof by a second predetermined level or more upon determining that the terminal voltage of the battery has not increased from the previous terminal voltage thereof by the first predetermined level or more;

performing a charge standby mode, in which the controller outputs a low signal to the charge and discharge connection switching unit and the constant power charge switching unit to disconnect the battery and the 2nd EDLC module from each other to temporarily prevent charge and discharge operations, upon determining that the terminal voltage of the battery has increased from the previous terminal voltage thereof by the first predetermined level or more or upon determining that the terminal voltage of the battery has rapidly decreased from the previous terminal voltage thereof by the second predetermined level or more;

comparing the terminal voltage of the battery and the charged voltage of the 2nd EDLC module and determining whether or not a voltage difference therebetween is a third predetermined level or more upon determining that the current mode is the charge standby mode, upon determining that the terminal voltage of the battery has not increased from the previous terminal voltage thereof by the first predetermined level or more, or upon determining that the terminal voltage of the battery has not rapidly decreased from the previous terminal voltage thereof by the second predetermined level or more;

performing a charge and discharge mode, in which the controller outputs a high signal to the charge and discharge connection switching unit and the constant power charge switching unit to connect the battery and the 2nd EDLC module to each other to enable normal charge and discharge operations, upon determining that the voltage difference between the terminal voltage of the battery and the charged voltage of the 2nd EDLC module is zero; and performing a constant power charge mode in which the controller outputs a low signal to the charge and discharge connection switching unit to disconnect the battery and the 2nd EDLC module from each other and outputs a constant power pulse signal to the constant power charge switching unit in order to charge the 2nd EDLC module with constant power which is proportional to the voltage difference upon determining that the voltage difference between the terminal voltage of the battery and the charged voltage of the 2nd EDLC module is the third predetermined level or more and outputs, when the voltage difference between the terminal voltage of the battery and the charged voltage of the 2nd EDLC module has dropped to zero after outputting the constant power pulse signal, a high signal to the charge and discharge connection switching unit and the constant power charge switching unit to connect the battery and the 2nd EDLC module to each other to enable normal charge and discharge operations.

13. The method according to claim 12, further comprising entering a preliminary charging mode upon determining that the vehicle engine is not running, and the preliminary charging mode includes:

the controller determining whether or not the terminal voltage of the battery is a normal reference voltage at which it is possible to perform charging, outputting a corresponding error indication to the display unit upon determining that the terminal voltage of the battery is not a normal reference voltage at which it is possible to perform charging, comparing the terminal voltage of the battery and the charged voltage of the 2nd EDLC module and determining whether or not a voltage difference therebetween is the third predetermined level or more upon determining that the terminal voltage of the battery is a normal reference voltage at which it is possible to perform charging;

outputting a low signal to the charge and discharge connection switching unit and the constant power charge switching unit to disconnect the battery and the 2nd EDLC module from each other upon determining that the voltage difference between the terminal voltage of the battery and the charged voltage of the 2nd EDLC module is not the third predetermined level or more; and outputting a low signal to the charge and discharge connection switching unit to disconnect the battery and the 2nd EDLC module from each other and outputting a constant power pulse signal to the constant power charge switching unit in order to charge the 2nd EDLC module with constant power which is proportional to the voltage difference upon determining that the voltage difference between the terminal voltage of the battery and the charged voltage of the 2nd EDLC module is the third predetermined level or more and outputting, when the voltage difference between the terminal voltage of the battery and the charged voltage of the 2nd EDLC module has dropped to zero after outputting the constant power pulse signal, a low signal to the charge and discharge connection switching unit and the constant power charge switching unit to disconnect the battery and the 2nd EDLC module from each other.

14. The method according to claim 12, wherein the constant power charge mode includes:

the controller outputting a low signal to the charge and discharge connection switching unit to turn the 1st FET off, outputting a constant power pulse signal to the constant power charge switching unit in order to charge the 2nd EDLC module with constant power which is proportional to the voltage difference between the battery and the 2nd EDLC module to switch the 2nd FET;

determining whether or not the 2nd EDLC module is discharging through the discharge detector;

determining whether or not the 2nd EDLC module has been completely charged upon determining that the 2nd EDLC module is not discharging; and outputting a high signal to the charge and discharge connection switching unit and the constant power charge switching unit to connect the battery and the 2nd EDLC module to each other upon determining that the 2nd EDLC module is discharging or upon determining that the 2nd EDLC module has been completely charged.

* * * * *